F. G. BEETEM.
HOUSING FOR BALL OR ROLLER BEARINGS.
APPLICATION FILED DEC. 21, 1914.

1,211,814.

Patented Jan. 9, 1917.

WITNESSES:
Lester Woodbridge
Joseph H Tracy

INVENTOR
Frank G. Beetem
BY
Augustus B. Stoughton
ATTORNEY.

UNITED STATES PATENT OFFICE.

FRANK G. BEETEM, OF PHILADELPHIA, PENNSYLVANIA.

HOUSING FOR BALL OR ROLLER BEARINGS.

1,211,814.

Specification of Letters Patent.

Patented Jan. 9, 1917.

Application filed December 21, 1914. Serial No. 878,344.

*To all whom it may concern:*

Be it known that I, FRANK G. BEETEM, a citizen of the United States, and residing in the city of Philadelphia, county of Philadelphia, and State of Pennsylvania, have invented certain new and useful Improvements in Housings for Ball or Roller Bearings, of which the following is a specification.

My invention relates to housings for ball or roller bearings, in which one or more closures or caps are provided to protect the bearings, and particularly for retaining the oil, grease or other lubricant which may be used to provide lubrication.

The principal object of my invention is to provide means for preventing the escape of the lubricant through the joints of the housing structure which is liable to occur under certain conditions of operation.

My invention will be claimed at the end hereof but will first be described in connection with the accompanying drawings, in which—

Figure 1:
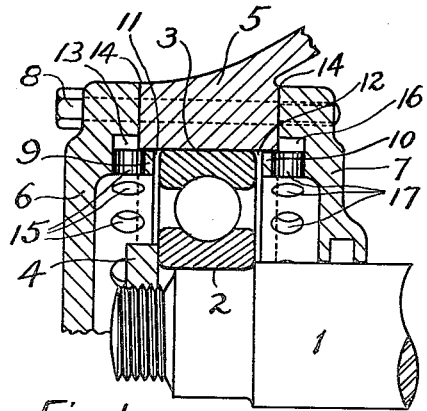
Figure 2:
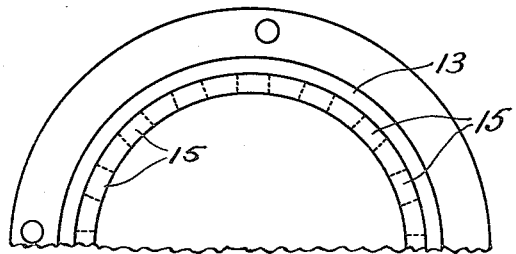
Figure 3:
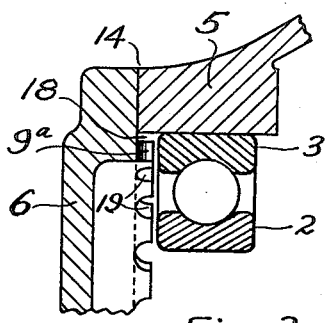
Figure 4:
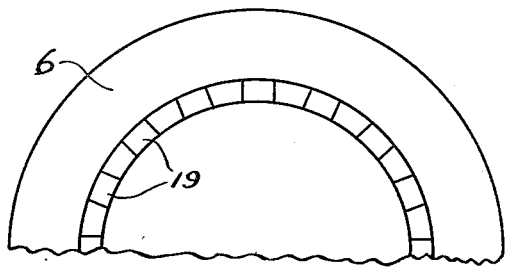
Figure 5:
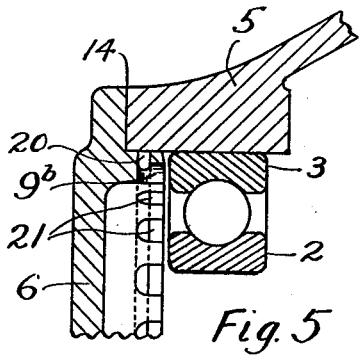
Figure 6:
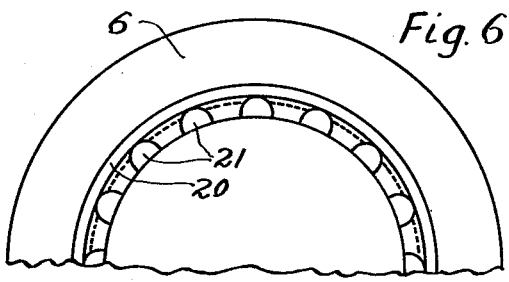

Figure 1 is a view partly in section of a portion of a ball bearing housing involving features of my invention. Fig. 2 is a side elevation of the cap shown in Fig. 1. Fig. 3 is a section of a portion of a ball bearing housing involving a modification of the structure shown in Fig. 1. Fig. 4 is a side elevation of the cap shown in Fig. 3. Fig. 5 is a sectional view of another modification, and Fig. 6 is a side elevation of the cap shown in Fig. 5.

Referring to Fig. 1, 1 is the end of a shaft on which is mounted a ball bearing whose inner race ring is shown at 2, and whose outer ring is shown at 3. The inner ring 2 is clamped to the shaft by means of the nut 4. The outer ring 3 is supported in the usual manner by the stationary portion of the machine frame structure, a part of the journal box being shown in section at 5. At 6 is shown in section the upper half of a cap or closure which covers the outer end of the shaft and the ball bearing, while at 7 is shown in section a similar closure covering the inside of the ball bearing. These two closures are attached to the frame 5 by means of bolts, one of which is shown at 8. The cap 6 is provided with an internally projecting shoulder 9 and the closure 7 is provided with a similar shoulder 10, which two shoulders serve to limit the longitudinal motion or "end-play" of the outer ring 3.

The two closures 6 and 7 serve to inclose a space or pocket which may be partly filled with grease or similar lubricant for lubricating the bearing.

It is found that with a structure similar to that which has thus far been described there is a tendency under certain conditions for the lubricant to escape through the joints 14 between the plates 6 and 7 and the frame 5. This tendency is particularly noticeable under conditions calling for sudden and comparatively violent longitudinal motion of the shaft, as is the case with street car motors or dynamos in axle lighting service. This tendency may be in part accounted for as follows: There will usually be a certain amount of clearance between the outer ring 3 and the projecting shoulders 9 and 10, which leaves a small amount of space at the points 11 and 12. This space, especially on the lower side of the bearing, will become filled with lubricant, and when a sudden longitudinal thrust of the shaft occurs, one of these spaces will be suddenly closed by the impact between the outer ring 3 and, for example, the shoulder 9. At the final instant of this impact, the pressure to which the lubricant in the space 11 is subjected becomes excessive, and at the same time any elasticity in the bolts 8 will allow the joint 14 between the cap 6 and the frame 5 to open slightly. The pressure will then force some of the lubricant through this opening. While the amount of lubricant which can thus escape during any one such impact may be small, yet if these impacts occur at sufficiently frequent intervals, the total amount of lubricant thus escaping may become quite appreciable. In order to prevent this escape, I have provided a closure, one form of which is shown in Fig. 1. This closure provides an annular space or channel 13 between the space 11 and the joint 14 in which any lubricant forced out of the space 11 may collect. This channel 13 is provided with a series of openings or ports 15 leading into the internal grease pocket or space around the bearing so that the grease which collects in the channel 13 will be returned to the grease pocket, and abnormal pressure in the channel 13 and joint 14 is prevented.

Fig. 2 is an elevation showing the inner face of the cap 6 with its channel 13 and openings 15. The inner plate 7 is similarly provided with a channel 16, and openings 17.

In Fig. 3 a modified construction to accomplish the same results is shown. In this case the projecting shoulder 9ª of the cap 6 is made somewhat smaller in diameter than the outer diameter of the ball bearing ring 3, leaving an annular space 18 in which the grease can collect before it reaches the joint 14. The channel 18 is similarly provided with openings 19 to permit the grease from the channel 18 to pass into the grease pocket, and prevent excessive pressure.

In Fig. 4 is shown a side elevation of the cap 6, the frame 5 being shown in section.

Still another modification is shown in Fig. 5 in which the shoulder 9ᵇ exactly fits the inner surface of the frame 5, but is provided with a groove 20 midway of the cylindrical portion of this fitted surface. Openings 21 extend from the groove 20 to the grease pocket.

Fig. 6 is a side elevation of the plate shown in Fig. 5, the channel being shown at 20 and the openings at 21.

Having described my invention what I claim and desire to secure by Letters Patent is—

1. In a device of the class described, the combination of a journal box, and an end closure abutting upon the box, thereby forming a joint, and having an annular shoulder forming with said parts a lubricant receiving channel in communication with the joint, and having ports in said shoulder communicating with said channel and with the interior of the box.

2. In a device of the class described, the combination of a journal box, a bearing ring therein, and end closure abutting upon the box, thereby forming a joint, an annular shoulder in respect to which the ring is afforded end play, and which forms with the box and closure a lubricant receiving channel in communication with said joint and ports in said shoulder communicating with said channel and with the interior of the box.

3. In a device of the class described, the combination of a journal box, a bearing ring therein, an end closure abutting upon the box, thereby forming a joint, an annular shoulder in respect to which the ring is afforded end play, a lubricant receiving channel between the joint and ring, and ports in said shoulder communicating with said channel and with the interior of the box, substantially as described.

4. In a device of the class described, the combination of a journal box, a bearing ring therein, and an end closure abutting upon the box, thereby forming a joint and in respect to which closure the ring is afforded end play, there being a lubricant receiving channel between the joint and the ring and ports communicating with said channel and with the interior of the box, substantially as described.

5. In a device of the class described, the combination of a journal box, a bearing ring therein, and a closure abutting upon the box, thereby forming a joint, and in respect to which closure the ring is afforded end play, there being a lubricant receiving channel communicating with the joint and with the end play space between the ring and the closure and ports communicating with the channel and the interior of the box, substantially as described.

In testimony whereof, I have hereunto signed my name.

FRANK G. BEETEM.

Witnesses:
J. LESTER WOODBRIDGE,
JOSEPH H. TRACY.